United States Patent [19]

Kaniut et al.

[11] Patent Number: 4,802,652
[45] Date of Patent: Feb. 7, 1989

[54] TAPERED BALL VALVE

[75] Inventors: Christopher P. Kaniut, Sulphur Springs, Tex.; Howard R. Dittmer, Buffalo Grove, Ill.

[73] Assignee: Rockwell International Corporation, Pittsburgh, Pa.

[21] Appl. No.: 149,284

[22] Filed: Jan. 28, 1988

[51] Int. Cl.$^4$ .............................................. F16K 5/20
[52] U.S. Cl. ................................... 251/181; 251/315
[58] Field of Search ............... 251/181, 184, 312, 315, 251/316; 137/240

[56] References Cited

U.S. PATENT DOCUMENTS

| | | | |
|---|---|---|---|
| 3,009,680 | 11/1961 | Kaiser | 251/315 |
| 3,177,887 | 4/1965 | Priese | 251/181 X |
| 4,203,460 | 5/1980 | Priese | 137/240 |

*Primary Examiner*—A. Michael Chambers
*Assistant Examiner*—John C. Fox

[57] ABSTRACT

A tapered plug valve having a body with a removable valve seat insert that can be replaced without removing the valve body from the operating site.

3 Claims, 1 Drawing Sheet

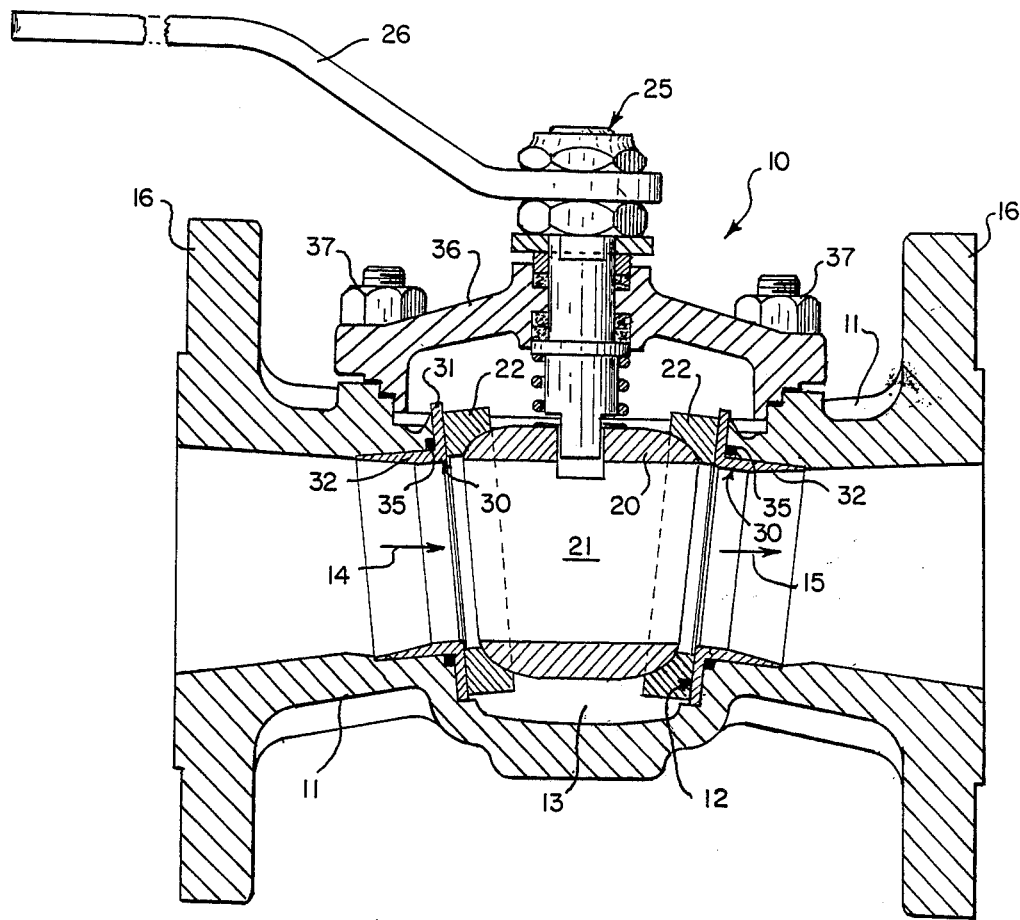

TAPERED BALL VALVE

BACKGROUND OF THE INVENTION

The present invention relates to the field of ball valves and more particularly to that type of valve which is known as a McCannaseal Ball Valve and is manufactured by the Rockwell International Corporation at Carpentersville, Ill. Ball valves have wide application in the control of fluids in various industrial applications. The construction usually takes the form of a cast valve body that defines an enclosed valve chamber having both inlet and outlet ports. Characteristically, there is provided a spherical ball valve held in valve seats that are generally located adjacent inlet and outlet ports. The valve is frequently, but not always, spring biased to urge it into firm contact with the valve seats. To permit the passage of fluid, an opening is provided across the diameter of the ball valve to provide an interconnection between the inlet and outlet ports of the valve body, when the valve is oriented or turned into that position. Various types of sealing arrangements are commonly provided to insure fluid integrity. Unlike most ball valves where the opening through the ball is along the diameter, as mentioned above, the opening, or through flow passage in the type of valve involved here is along a line parallel to the diameter but spaced therefrom. By thus displacing the flow passage, the usual spherically appearing ball valve becomes in effect a tapered ball. This latter shape permits the valve body to have a top access opening that permits the valve and valve seats to be efficaciously removed for repair and replacement as required, without removal of the entire valve assembly from its operational environment.

Since operating conditions, as well as the materials being controlled by a valve may vary significantly, the material of which the valve is constructed will be selected accordingly. Assuming that anticipated operating conditions are to be benign, then material such as plain carbon steel could be that material selected; whereas under more demanding or restrictive conditions a stainless steel or some other high alloy material may be the selection of choice. Generally, selection of materials according to sound engineering prescription will result in valve operation and life suitable for normal applications. Beyond that spectrum into which most valve usage falls, however, are those unusually demanding situations in which valve life is significantly decreased. Where a valve must handle a slurry, such as paper pulp or coal slurry for example, useful valve life is markedly reduced because of erosion of the valve body in the regions adjacent to the valve seats. When this erosion progresses far enough, the entire valve must be removed from the line and replaced. The same problem also occurs when the valve must handle highly corrosive fluids, such as many of those utilized in the chemical industry.

One example of a typical rotary plug valve is seen in Johnson, Jr. et al U.S. Pat. No. 3,211,421. In this patent a spherical valve member 52 having a spherical sealing surface 54 is located within the chamber 48 located between aligned fluid passages 46. The ball is sealed by means of the resilient mass 14 which comes into contact with the spherical surface 54. The inner wall between end walls 50 of the chamber 48 are sealed by means of the resilient O-ring 44 as the member 50 is pushed back against the other end wall of the valve casing.

Another example is that shown in U.S. Pat. No. 4,111,393 in which there is provided a seat ring 50 into which is mounted seat insert 52. An additional element that is provided is the O-ring 54 that co-acts with both the seat ring 50 and the seat insert 52 to make up a composite sealing arrangement that contacts the outer surface of ball 16.

A principal object of this invention is to provide an improved tapered ball valve in which the valve body is provided with means permitting maintenance to be performed on the valve body in such a way that the effects of corrosion and erosion can be compensated for without replacing the entire valve body.

An additional object of this invention is to provide an improved tapered ball valve in which a valve seat insert is provided that is removable for replacement to correct for erosive and corrosive damages.

Other objects and advantages of this invention will be in part obvious and in part explained by reference to the accompanying specification and drawings in which:

The FIGURE is a side elevation, partially in section, illustrating the improved valve construction of this invention.

DESCRIPTION OF THE PREFERRED EMBODIMENT

Referring to the FIGURE of the drawings, the numeral 10 indicates generally a tapered ball valve constructed in accordance with the invention. More specifically, the valve is made up of a valve body 11 that has an inner wall 12 that defines a valve chamber 13. Entrance to valve chamber 13 is effected through an annular inlet opening 14 while exit from chamber 13 is accomplished by means of the outflow opening 15. This valve is of the top opening type and terminates in a pair of end flanges 16 by means of which connection can be made to the pipe that is used in conjunction with valve 10.

Control of fluid flow can be effected by means of a ball valve member 20 that is disposed within the valve chamber 13. It will be noted that the ball has a generally tapered configuration, the taper being obtained by providing an opening 21 which extends along a line parallel to a diameter of the ball 20 but spaced some distance therefrom. Ball valve member 20 is operably disposed within valve seat means 22 which may be constructed of some elastomeric material such as teflon or alternatively may be constructed of metal or ceramic material if the operating conditions require this degree of performance. The ball 20 can be rotated by means of the operator mechanism 25 which includes the handle 26 for applying operating torque.

It was earlier indicated that one of the problems encountered when utilizing valves in erosive or corrosive environments is that of having the body of the valve adjacent the inlet and outlet orifices leading from the valve chamber erode or corrode away. Formerly, when the damage becomes great enough, then it is necessary to remove the entire valve and valve body from the operating line and replace it with new equipment. This invention has found a way to overcome the problem of replacing the valve by providing valve seat inserts 30, one insert being provided for the inlet opening 14 and one being provided for the outlet opening 15. Each insert can be constructed of any selected material which is suitable for the operating conditions of the valve. As can be seen from the drawing, each insert has a first leg 31 that has an inner wall that is coplanar with the inner wall 12 of the valve body 11. Each insert 30 also has a second leg 32 that extends outwardly from the valve chamber 13 into its respective flow opening. At the angle enclosed by the two legs 31 and 32 of each valve insert 30 there is an O-ring 35 that insures that complete sealing of the valve is achieved.

After the valve seat inserts, valve seats and ball valve member 20 have been inserted into the chamber 13, the entire upper end of the overall valve is closed by means of the cap 36 that is tightened onto the body 11 by means of threaded fasteners 37. With this construction, at any stage during the lifetime of the valve when an insert becomes so worn or corroded that it is no longer functioning correctly, the valve need only be opened by removing the cap 36, removing the internal parts and replacing the valve seat inserts. After replacement of the inserts, the valve can then be reassembled without the necessity of removing the valve body from the operating line.

We claim:

1. A tapered ball valve comprising:
   (a) a valve body having an inner wall defining a valve chamber said chamber having annular inlet and outlet flow openings;
   (b) valve seat insert means disposed with said valve chamber, said insert means having a first leg with an inner wall that is coplanar with the inner wall of the body and a second leg that extends outwardly from said valve chamber into its respective flow opening:
   (c) sealing means located at the angle enclosed by said first and second legs and between said insert means and said valve body to insure complete sealing of the valve;
   (d) valve seat means mounted within said valve seat insert means;
   (e) a ball valve member operably disposed within said valve seat means for rotation between flow enabling and flow disabling positions; and
   (f) closure means attachable to said valve body to seal said valve chamber and hold said valve seat insert, valve seat and plug valve member in assembled positions.

2. A tapered ball valve as defined in claim 1 wherein said valve body is shaped in the vicinity of said inlet and outlet openings to receive said valve seat insert second leg and position it substantially outside of the path of flow through said valve body.

3. A tapered ball valve as defined in claim 1 wherein said valve seat insert is substantially L-shaped in cross-section.

* * * * *